Figure 1:
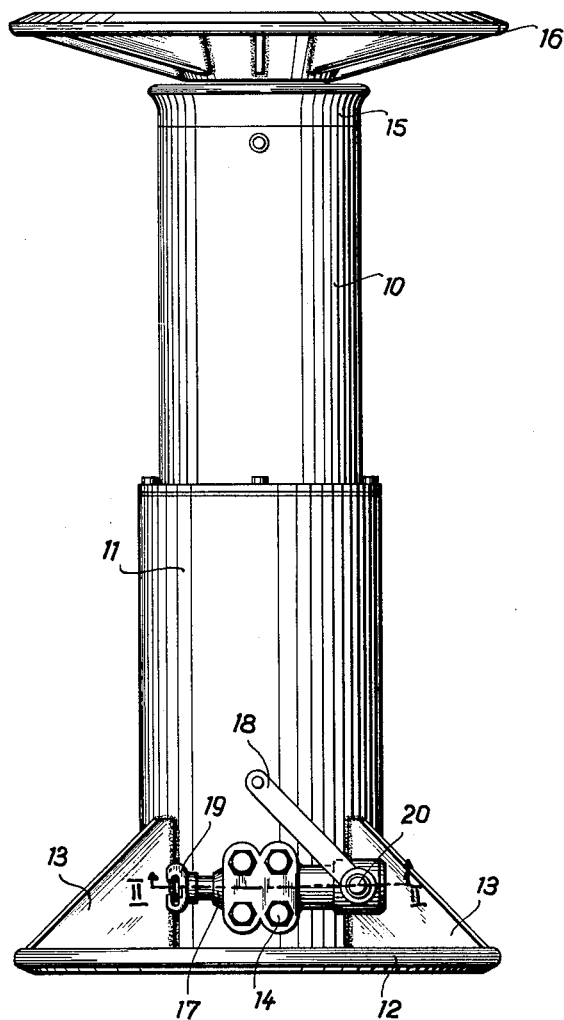

Aug. 22, 1961 W. L. G. HEUSNER 2,997,272
CONTROL VALVE FOR USE IN CONNECTION WITH
THE BUILDING OF MINE SHAFTS
Filed Dec. 18, 1957 4 Sheets-Sheet 3

United States Patent Office 2,997,272
Patented Aug. 22, 1961

2,997,272
CONTROL VALVE FOR USE IN CONNECTION WITH THE BUILDING OF MINE SHAFTS
Wilhelm Ludwig Gustav Heusner, Bochum-Weitmar, Germany, assignor to Hermann Schwarz K.G., Wattenscheid, Germany
Filed Dec. 18, 1957, Ser. No. 703,618
Claims priority, application Germany Dec. 18, 1956
1 Claim. (Cl. 251—83)

The present invention relates to a control valve for use in connection with the building of mine shafts and, more particularly, concerns a control valve for multi-part hydraulic elements of mine constructions in which one part is connected with a piston, whereas the other part is connected with a pressure fluid filled cylinder, while the movement of said parts into each other is possible only when said pressure fluid is compressed or released.

The control valve according to the present invention is intended particularly for controlling the filling of hydraulic mine props with pressure fluid and for controlling the release of said pressure fluid therefrom.

A control valve of this type has to meet various requirements. The delivery of the pressure fluid into the pressure chamber of the mine prop or similar mine shaft construction elements must be effected as quickly as possible. This requires a large opening cross section of the valve. During the load on the respective construction element, the valve must close said pressure chamber in a reliable manner. As a rule, the pressure prevailing in the pressure chamber is made use of for exerting the closing pressure. When robbing the respective construction element, the pressure in the pressure chamber is to be released as quickly as possible. When the valve has a large cross section and the inner pressure acts upon the closed valve, certain difficulties are encountered when the valve is to be opened. This is due to the fact that the force employed for opening the valve has to overcome the inner pressure acting upon the cross sectional surface of the valve body. In order to keep this force within reasonable limits, stage valves have been employed which operate in such a manner that first a valve with considerably smaller cross section is opened against the pressure prevailing in the inner chamber so that the inner pressure is considerably reduced by the release of the pressure fluid.

It is an object of the present invention to provide a control valve for use in connection with the filling and robbing of hydraulic construction elements for use in connection with the building of mine shafts and the like, which will overcome the above mentioned drawbacks.

It is another object of this invention to provide a control valve of the above mentioned type, which will employ a single valve body only and will be so designed that the pressure which prevails in the inner chamber of the respective construction element, will initiate the opening of the valve body while the valve is still closed, after a locking mechanism has been made ineffective.

It is also an object of this invention to provide a filling and robbing valve, for instance for use in connection with hydraulic mine props, which will also meet the requirements of the so-called mobile support. With such mine shaft construction elements which, in order to facilitate their transport on the sill or floor of a seam, are provided with skids, particularly high pressures of the pressure fluid are employed.

Figure 2:
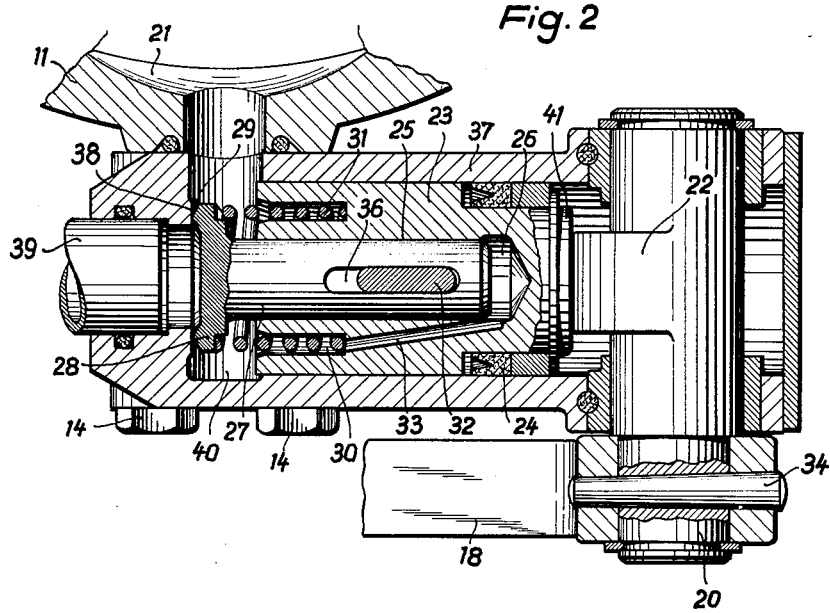
Figure 3:
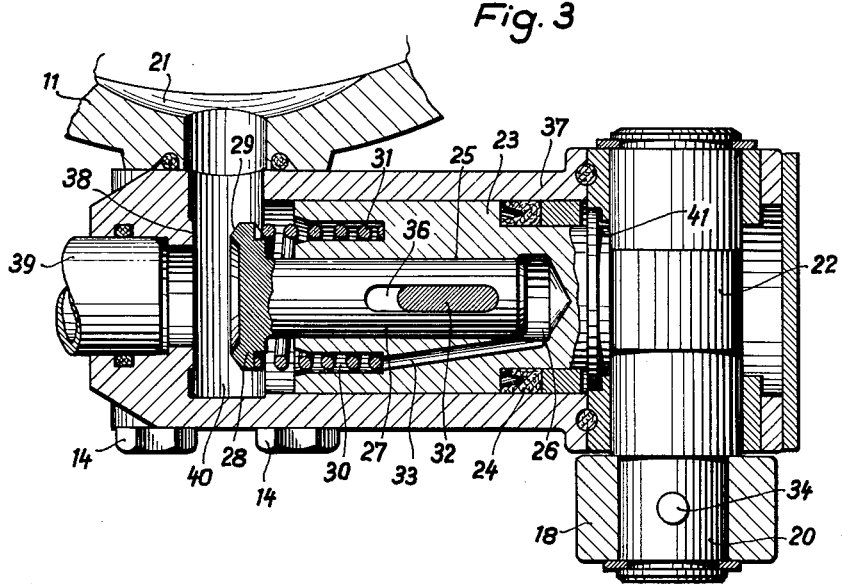
Figure 4:
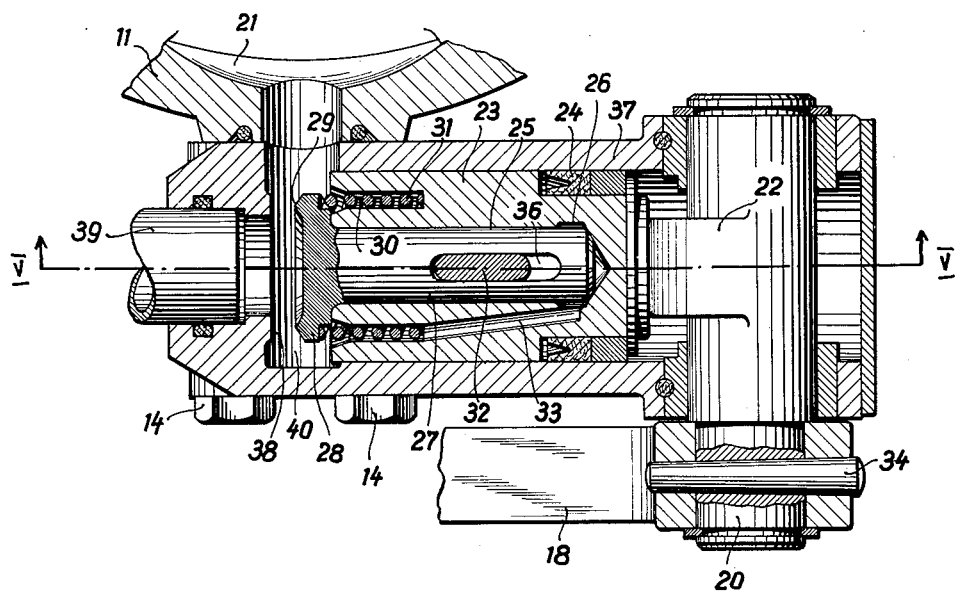
Figure 5:
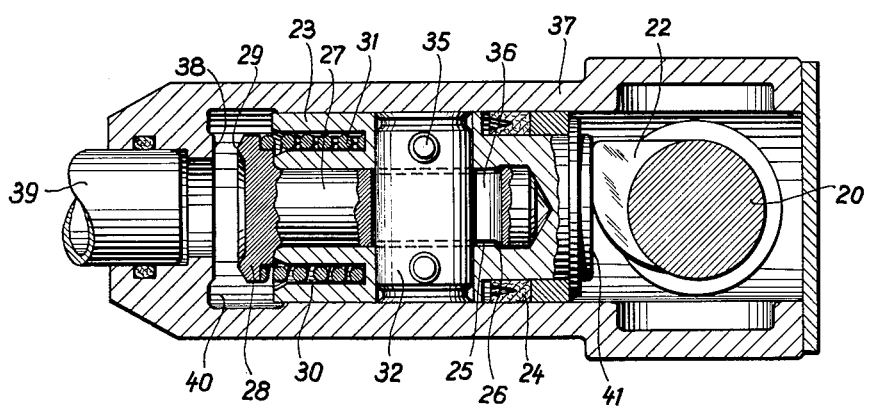

These and other objects and advantages of the invention will appear more clearly from the following specification in connection with the accompanying drawings in which:

FIG. 1 is a view of a mobile support equipped with a valve according to the invention.
FIG. 2 is a horizontal section through the valve along the line II—II of FIG. 1 and illustrates the valve in its operative position.
FIG. 3 is a horizontal section similar to that of FIG. 2 through the valve of the invention but illustrates the valve during the robbing operation.
FIG. 4 is likewise a horizontal section through the valve but illustrates the valve during the filling operation.
FIG. 5 is a section through the valve along the line V—V of FIG. 4.

*General arrangement*

The filling and stripping or robbing valve according to the present invention is characterized primarily in that the shank of the valve body which is held in its closing position by the enclosed pressure fluid is slidably arranged in the axial bore of a piston the cross section of which exceeds that of the valve body and the front surface of which, which faces the valve, is continuously acted upon by the pressure fluid. The valve body is relative to the piston supported by a spring which moves said valve body by a certain distance in the direction toward the valve seat. The axial displaceability between valve and piston is limited by a follower. By means of a lock, the piston may be held in a position closer to the valve seat. The said lock is preferably so designed that it can be actuated from the outside. If said lock is released, the piston due to the pressure in the inner chamber retracts. The stroke of the spring which moves the valve body, and the relative axial displaceability of the piston and the valve body are so dimensioned that in the first mentioned position of the piston the valve body will tightly rest upon the fixed seat while the pressure chamber is filled, whereas in the second position of the piston, the valve body is lifted off the valve seat.

The lock by means of which the piston is moved into the position (working position) closer to the valve seat while the pressure chamber is under no pressure, may be formed by an eccentric or the like which acts upon the piston the rear surface of which is not under the load of the pressure fluid. By means of a spring or the like, the eccentric may be so loaded that it can be opened against the said spring force only whereas the eccentric returns automatically into working position when no load acts upon said eccentric.

In order to be able to exploit the effective cross section of the valve body including the shank cross section as pressure surface which presses the valve upon its seat, the inner end of the piston bore receiving the valve shank is in continuous communication with the pressure chamber through passages in said piston.

A mobile support in connection with which a filling and robbing valve according to the present invention may be employed is illustrated in the attached drawings.

Structural arrangement

Referring now to the drawings in detail and FIG. 1 thereof in particular, the reference numeral 10 designates the upper prop member with the ball-shaped closure member 15 and the superimposed head plate 16. The lower prop member 11 is provided with a foot 12 and reinforcing ribs 13. The filling and robbing valve is designated with the reference numeral 17 and is connected to the lower prop member by means of screws 14. The filling and robbing valve 17 is equipped with a connection 19 for connection with a pressure fluid conduit, while a manually operable lever 18 is mounted on an eccentric shaft 20.

The pressure chamber 21 (see FIGS. 2, 3 and 4) of the mobile support communicates with the valve chamber 40 which latter is to be shut off from the connecting conduit 39. This interruption of communication between the conduit 39 and the valve chamber 40 is effected for instance by a valve head 28 which is adapted by means of its sharp edges 29 to engage the valve seat 38 in a sealing manner. Instead of such a so-called disc valve, also a ball supported by the valve body may be employed, or the valve body itself may be designed as cone-shaped or needle valve. The shape of the valve seat will depend on the respective shape of the valve body employed. The shank 27 of the valve body is slidably mounted in a bore 25 of a piston 23 which is reciprocable in the cylinder 37 and is sealed by sleeves 24 with regard to the walls of the cylinder 37. The widened portion 26 of the bore which forms a chamber communicates through passages 33 with an annular groove 30 and thereby also with the chamber 40 so that when the valve is closed, there will in the chamber 26 always prevail the inner pressure of the chamber 21. A pressure spring 31 rests against the bottom surface of the annular groove 30. The free end of the pressure spring 31 acts upon the outer marginal portion of the valve disc 28. Provided in the shank 27 of the valve is a vertical slot 36 the front and rear end of which is adapted to arrest a flat bar 32 extending through the slot 36 and forming a follower which by means of screws 35 (FIG. 5) is fixedly arranged in the piston 23.

Shaft 20 has mounted thereon a cam 22 which rests against the rear surface 41 of the piston 23 which in the shown position is not under the load of the pressure fluid. The lever 18 provided for actuating shaft 20 is secured thereto by means of a key 34.

The operation of the device is as follows. If the pressure chamber 21 is to be filled, first by shifting the lever 18, the shaft 20 is rotated to such an extent that the cam 22 as illustrated in FIGS. 2 and 4 rests against the rear surface 41 of the piston 23 so that the latter will occupy a position closer to the valve seat 38. If in the feeding conduit 39 a pressure prevails which is higher than the pressure in the chambers 40 and 41a, the valve disc 28 will be lifted off from its seat 38 against the thrust of spring 31, and shank 27 will be moved in the bore 25. The valve will then be in open position (see FIG. 4). Fluid pressure will now be admitted as long as the pressure in conduit 39 exceeds the pressure in chambers 40 and 41a and the thrust of the pressure spring 31.

After the filling operation has been completed (see FIG. 2), the valve disc 28 rests against the valve seat 38. It is held in this closing position by the pressure which acts upon the marginal surface of the valve disc 28 and the rear surface of the shank 27 which surface extends into the pressure chamber 26. Thus, the entire inner pressure acts as closing pressure. In closing position, the follower 32 rests against the rear end of slot 36.

If the construction element is to be robbed, lever 18 is shifted and shaft 20 and cam 22 are turned. Cam 22 then releases the pressure in chamber 41a upon the rear surface 41 of piston 23 (FIG. 3). The pressure prevailing in chamber 40 will then act upon piston 23 over the entire cross sectional surface of the latter. This force is greater than the force at which the pressure acts upon the valve disc 28 and shank 27. When the cam 22 is turned, piston 23 moves away from the valve seat and carries along shank 27 and valve disc 28 in view of the coupling effected by the wall of the slot 36 and the follower 32. Pressure spring 31 is so dimensioned that it presses valve disc 28 in the position shown in FIG. 2 against the valve seat 38 but moves only slightly further away from piston 23 when the latter continues its movement in the direction away from valve seat 38. Valve disc 28, therefore, releases an opening between the chamber 39 and 40 so that the pressure in chamber 21 will be released.

It is not under all circumstances necessary that in the closing position the follower 32 rests against the rear end of slot 36 provided in the valve shank 37. It is also possible that the follower 32 is spaced from the slot end so that when the cam 22 is made ineffective, piston 23 first moves along in the opening direction so that an increase in the volume of the pressure chamber and thereby a pressure drop is effected. During the further movement of the piston 23 the latter carries along the valve body so that the valve will be opened.

Prior to the initiation of a new filling operation, cam 22 is shifted back, and piston 23 is moved into a position closer to the valve seat 38.

From the above it will be clear that the pressure prevailing in the inner chamber will by itself, after the lock has become ineffective (eccentric shaft 20, cam 22), bring about the opening of the valve without the employment of additional forces.

It is, of course, to be understood that the present invention is, by no means, limited to the particular construction shown in the drawings but also comprises any modifications within the scope of the appended claim.

A particular advantage of the control valve according to the present invention consists in that simple means can be used to fill the pressure fluid chamber.

If, for example, the chamber 21 is to be filled from a pressure fluid piping, a flexible tube of the piping and the connection piece 19 will be joined. The flexible tube usually is equipped with only a stopcock at its ends. This stopcock will be opened and remains open until the fluid pressure in the chamber 21 equals the pressure in the piping. Then the control valve is closed by the thrust of the spring 31 forcing the valve disc 28 to rest against the valve seat 38, and the flexible tube, after closing its stopcock, and the connection piece 19 may be disconnected.

If a pressure fluid of low cost, e.g. water is to be used, which may be discarded, when the pressure in the chamber 21 is released, no further piping is necessary, and, after shifting the lever 18, the fluid flows out of the connection piece 19.

If, on the other hand, the mine shaft is filled by a fluid of appreciable value, e.g. oil, the connection piece 19 will be connected to a tube, which may alternatively be connected to a pressure tank and a storage tank by a two way-valve or other means known in the art.

What I claim is:

In combination in a filling and robbing valve for a multi-part hydraulically operable mine shaft construction element having a pressure fluid receiving chamber: a cylinder having a cylinder chamber adapted to be connected with said pressure fluid receiving chamber of said construction element, said cylinder chamber also having a valve bore confined by a valve seat and adapted to be connected with a pressure fluid source, a piston reciprocably mounted in said cylinder and having one end exposed to said cylinder chamber so as to be able to be acted upon by pressure fluid in said cylinder chamber, said piston having an axial bore and a piston chamber communicating with said axial bore and arranged at that end of said axial bore which is remote from said valve seat, said piston including passage means continuously establishing communication between said piston chamber and said cylinder chamber, a valve member having a shank slidably mounted in said axial bore and carrying a valve body adapted to engage said valve seat for controlling said valve bore, that surface of said piston which is exposed to said cylinder chamber having a larger effective cross-sectional area than the effective area of said valve body, said shank being provided with an axially extending slot, a follower connected to said piston and extending through said slot, the length of said slot being greater than the length of said follower, spring means interposed between said piston and said valve body and continuously urging the latter into engagement with said valve seat, and adjustable abutment means for selective engagement with that end of said piston which is remote from said cylinder chamber.

References Cited in the file of this patent
UNITED STATES PATENTS

| | | |
|---|---|---|
| 1,710,983 | Howarth | Apr. 30, 1929 |
| 1,925,610 | Shinn | Sept. 5, 1933 |
| 2,307,644 | Schlumbrecht | Jan. 5, 1943 |
| 2,634,748 | Morrison | Apr. 14, 1953 |